United States Patent [19]

Kuhlthau

[11] 4,252,716
[45] Feb. 24, 1981

[54] BENZTHIAZOLYL-AZO-INDOLE BASIC DYESTUFFS

[75] Inventor: Hans-Peter Kuhlthau, Leverkusen, Fed. Rep. of Germany

[73] Assignee: Bayer Aktiengesellschaft, Leverkusen, Fed. Rep. of Germany

[21] Appl. No.: 39,105

[22] Filed: May 15, 1979

Related U.S. Application Data

[63] Continuation-in-part of Ser. No. 414,218, Nov. 9, 1973, abandoned.

[30] Foreign Application Priority Data

Nov. 10, 1972 [DE] Fed. Rep. of Germany ....... 2255058

[51] Int. Cl.³ .................... C09B 29/22; C09B 29/36; C09B 31/14
[52] U.S. Cl. ............................. 260/158; 260/146 R; 260/165
[58] Field of Search .................... 260/158, 146 R, 165

[56] References Cited

U.S. PATENT DOCUMENTS

| | | | |
|---|---|---|---|
| 2,832,764 | 4/1958 | Huenig | 260/158 |
| 3,136,751 | 6/1964 | Iizuka | 260/158 |
| 3,255,173 | 6/1966 | Dehnert | 260/158 X |
| 3,763,140 | 10/1973 | Entschel | 260/158 |

Primary Examiner—John F. Niebling
Attorney, Agent, or Firm—Sprung, Felfe, Horn, Lynch & Kramer

[57] ABSTRACT

Basic dyestuffs of the formula

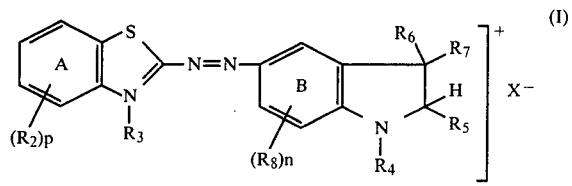

Wherein
$R_2$ denotes a non-ionic substituent,
$R_3$, $R_4$ denote alkyl, alkenyl, cycloalkyl or aralkyl,
$R_5$ denotes hydrogen, alkyl, cycloalkyl or aryl,
$R_6$ denotes hydrogen or alkyl, and $R_5$ and $R_6$ can together complete a cycloalkyl ring,
$R_7$ denotes hydrogen or alkyl, and $R_6$ and $R_7$ can together complete a cycloalkyl ring,
$R_8$ denotes a non-ionic substituent or a carboxyl group,
p denotes the numbers 0, 1, 2, 3 or 4,
n denotes the numbers 0, 1, 2 or 3 and
$X^-$ denotes an anion, are suitable for dyeing and printing of natural and synthetic materials, particularly of polyacrylonitrile, copolymers of acrylonitrile with other vinyl compounds of acid modified polyesters and acid modified polyamides.

10 Claims, No Drawings

BENZTHIAZOLYL-AZO-INDOLE BASIC DYESTUFFS

This application is a continuation-in-part of U.S. patent application Ser. No. 414218 filed Nov. 9, 1973 now abandoned.

The invention relates to basic dyestuffs of the formula

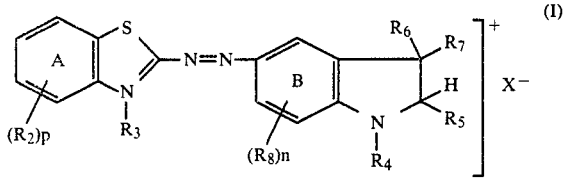

wherein
$R_2$ denotes a non-ionic substituent,
$R_3$ denotes alkyl, alkenyl, cycloalkyl or aralkyl,
$R_4$ denotes alkyl, alkenyl, cycloalkyl or aralkyl,
$R_5$ denotes hydrogen, alkyl, cycloalkyl or aryl,
$R_6$ denotes hydrogen or alkyl, and $R_5$ and $R_6$ can together complete a cycloalkyl ring,
$R_7$ denotes hydrogen or alkyl, and $R_6$ and $R_7$ can together complete a cycloalkyl ring,
$R_8$ denotes a non-ionic substituent or a carboxyl group,
p denotes the numbers 0, 1, 2, 3 or 4,
n denotes the numbers 0, 1, 2 or 3 and
$X^-$ denotes an anion.

Furthermore, mixtures of the dyestuffs I, their manufacture and their use for dyeing and printing natural and synthetic materials form a subject of this invention. The rings A and B can be fused to further rings. The cyclic and acyclic radicals can contain further non-ionic substituents and/or carboxyl groups.

Suitable substituents of the rings A and B are, for example: halogen, alkyl, cycloalkyl, aralkyl, hydroxyl, alkoxy, aryloxy, aralkoxy, nitro, alkoxycarbonyl, aryloxycarbonyl, aralkoxycarbonyl, carboxyl, nitrile, thiocyano, acyl, acylamino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkyl-sulphamoyl, alkylsulphonyl, arylsulphonyl or trifluoromethyl.

The substituents present in one and the same ring can be identical or different.

An acyl is understood as the radical of an aliphatic, aromatic or heterocyclic carboxylic acid or sulphonic acid.

The rings fused to the rings A and B are preferably benzene rings.

An alkyl radical or alkenyl radical is understood as a saturated or unsaturated optionally substituted aliphatic hydrocarbon radical of, preferably, 1–6 or 2–6 C atoms, respectively, such as methyl, trifluoromethyl, ethyl, chloroethyl, bromoethyl, hydroxyethyl, methoxyethyl, cyanoethyl, acetoxyethyl, aminocarbonylethyl, carboxyethyl, i-propyl, n-butyl, i-butyl, t-butyl, i-amyl, allyl, methallyl, γ-chloroallyl, propargyl, cyanomethyl, γ-cyanopropyl, β-hydroxy-n-propyl, β-hydroxy-n-butyl, β-hydroxy-i-butyl, β-hydroxy-γ-allyloxy-n-propyl or γ-methoxycarbonyl-n-butyl.

Examples of possible aralkyl radicals are: phenylmethyl, phenylethyl, β-phenyl-β-hydroxy-ethyl, phenyl-propyl(2,2) and optionally their derivatives substituted in the phenyl nucleus.

As cycloalkyl, cyclohexyl is of particular importance.

Aryl preferably represents phenyl and naphthyl and their derivatives, such as 4-methylphenyl, 2-methylphenyl, 4-chlorophenyl, 2-chlorophenyl and 2-methyl-4-chlorophenyl.

Non-ionic substituents in the sense of the present invention are substituents which are customary in dyestuff chemistry and do not dissociate under the reaction conditions in question, such as fluorine, chlorine or bromine; alkyl groups, especially straight-chain or branched alkyl radicals with 1–6 C atoms; aralkyl radicals; alkenyl radicals; aryl radicals; alkoxy radicals, especially alkoxy radicals with 1–4 C atoms; cycloalkoxy radicals; cycloalkenyloxy radicals; aralkoxy radicals; aryloxy radicals; aryloxyalkoxy radicals; and alkylthio radicals, preferably alkylthio radicals with 1–3 C atoms; aralkylthio radicals; arylthio radicals; nitro; nitrile; alkoxycarbonyl, preferably having an alkoxy radical with 1–4 C atoms; the formyl radical; alkylcarbonyl radicals, especially those with an alkyl group with 1–4 C atoms; arylcarbonyl; arylcarbonyloxy radicals; alkylcarbonyloxy radicals; aralkylcarbonyl radicals; alkoxycarbonyloxy radicals, preferably with an alkyl group with 1–4 C atoms; alkylcarbonylamino radicals, preferably with an alkyl group with 1–4 C atoms, and arylcarbonylamino radicals; arylaminocarbonyloxy radicals and alkylaminocarbonyloxy radicals; alkylsulphonylamino radicals, preferably with an alkyl group with 1–3 C atoms; arylsulphonylamino groups and ureido, N-aryl- or N-alkyl-ureido, aryloxycarbonylamino, alkyloxycarbonylamino, carbamoyl, N-alkyl-carbamoyl, N,N-dialkylcarbamoyl, N-alkyl-N-aryl-carbamoyl, sulphamoyl, N-alkylsulphamoyl, N,N-dialkylsulphamoyl, alkylsulphonyl, alkenylsulphonyl or aralkylsulphonyl radicals, the alkyl radicals mentioned preferably containing 1–4 C atoms; arylsulphonyl, carboxylic acid alkyl ester, carboxylic acid aryl ester, sulphonic acid alkyl ester and sulphonic acid aryl ester groups.

Possible anionic radicals $X^-$ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorizincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of formic acid, acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n- butyric acid, i-butyric acid, 2-methylbutyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethyl-glycollic acid, thioglycollic acid, glyceric acid, malic acid, dodecyl-tetraethylene glycol-ether-propionic acid, 3-(nonyloxy)-propionic acid, 3-(isotridecyloxy)-propionic acid, 3-(isotridecyloxy)-diethylene glycol-ether-propionic acid, the ether-propionic acid of the alcohol mixture with 6 to 10 carbon atoms, thioacetic acid, 6-benzoylamino-2-chlorocaproic acid, nonylphenoltetraethylene glycol-ether-propionic acid, nonylphenol-diethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic and (isomer mixture), tartaric acid, citric acid, glyoxylic acid, dimethyl ether-$\alpha,\alpha'$-dicarboxylic acid, methylene-bis-thioglycollic acid, dimethyl sulphide-$\alpha,\alpha$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8$–$C_{15}$ paraffinsulphonic acid, obtained by chlorosulphonation of paraffin oil.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-$\omega$-sulphonic acid, 2-chlorotoluene-4-sulphonic acid, 2-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of a heterocyclic sulphonic acid is the anion of quinoline-5-sulphonic acid.

Further anions which can be used are those of arylsulphinic, arylphosphonic and arylphosphonous acids, such as benzenesulphinic acid and benzenephosphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents or at least do not influence it adversely are frequently also preferred.

The anion is in general decided by the manufacturing process and by the purification of the crude dyestuff which may be carried out. In general the dyestuffs are in the form of halides (especially chlorides or bromides) or methosulphates, ethosulphates, sulphates, benzenesulphonates or toluenesulphonates, or acetates. The anions can be replaced by other anions in a known manner.

Dyestuffs to be singled out are those of the general formula

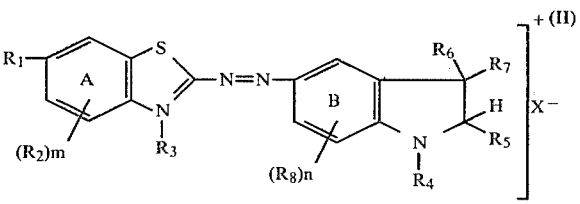

wherein
$R_1$ denotes hydrogen, alkyl, cycloalkyl, aralkyl, alkoxy, aryloxy, aralkoxy or acylamino,
$R_2$ denotes a non-ionic substituent,
$R_3$ denotes alkyl, alkenyl, cycloalkyl or aralkyl,
$R_4$ denotes alkyl, alkenyl, cycloalkyl or aralkyl,
$R_5$ denotes hydrogen, alkyl, cycloalkyl or aryl, $R_6$ denotes hydrogen or alkyl, and $R_5$ and $R_6$ can together complete a cycloalkyl ring, $R_7$ denotes hydrogen or alkyl, and $R_6$ and $R_7$ can together complete a cycloalkyl ring, $R_8$ denotes a non-ionic substituent or a carboxyl group m denotes the numbers 0, 1, 2 or 3, n denotes the numbers 0, 1, 2 or 3 and $X^-$ denotes an anion.

Interesting dyestuffs are those of the general formula

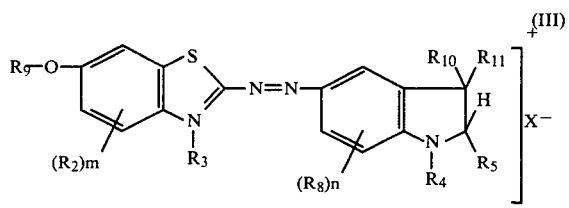

wherein $R_2$, $R_3$, $R_4$, $R_5$, $R_8$, m, n and $X^-$ have the meaning mentioned for formula I or formula II and $R_9$ represents alkyl with 1-4 C atoms, $R_{10}$ represents hydrogen or methyl, $R_{11}$ represents hydrogen or methyl, or $R_{11}$ and $R_5$ together form a —CH$_2$—CH$_2$—CH$_2$—CH$_2$— chain.

Dyestuffs of particular importance are those of the general formula

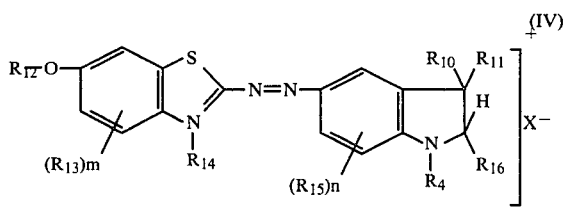

wherein $R_4$, $R_{10}$, $R_{11}$, m, n and $X^-$ have the meaning mentioned for formula II or formula III and $R_{12}$ represents methyl, ethyl, propyl or butyl, $R_{13}$ represents methyl, ethyl, methoxy, ethoxy, chlorine, bromine, fluorine, trifluoromethyl, phenoxy or benzyloxy, $R_{14}$ represents methyl, ethyl, propyl, butyl, β-chloroethyl, β-cyanoethyl, β-bromoethyl, β-acetoxyethyl, β-carboxyethyl, β-carbonamidoethyl, allyl or benzyl, $R_{15}$ represents methyl, ethyl, methoxy, ethoxy, fluorine, chlorine, bromine, trifluoromethyl, nitrile, thiocyanato, nitro, carboxyl, aminocarbonyl, aminosulphonyl, acetyl, benzoyl, phenoxy, benzyloxy, carboxylic acid methyl ester, ethyl ester, phenyl ester or benzyl ester, methylsulphonyl, ethylsulphonyl or phenylsulphonyl, and $R_{16}$ represents methyl, phenyl, γ-cyanopropyl or γ-methoxycarbonyl-n-butyl.

Amongst the formula IV, dyestuffs to be singled out are those in which $R_4$ represents β-hydroxyethyl, β-chloroethyl, n-butyl or benzyl, $R_{12}$ represents CH$_3$ or C$_2$H$_5$, $R_{14}$ and $R_{16}$ represent CH$_3$ and m and n represent 0.

Further valuable dyestuffs are those of the general formula

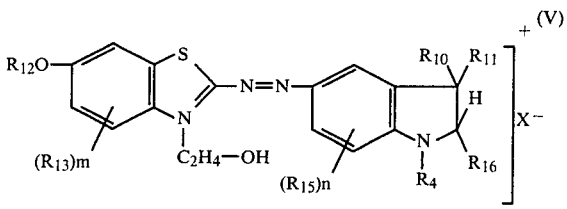

wherein $R_4$, $R_{10}$, $R_{11}$, $R_{12}$, $R_{13}$, $R_{15}$, $R_{16}$, m, n and $X^-$ have the abovementioned meaning.

In dyestuffs of the formula V which are of very particular importance, $R_{12}$ represents CH$_3$ or C$_2$H$_5$, $R_{16}$ represents CH$_3$ and m and n represent the number 0.

Further dyestuffs of particular interest are those of the general formula

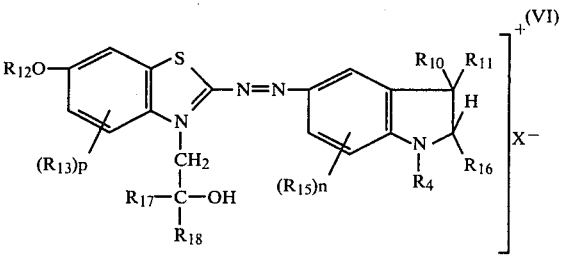

wherein $R_4$, $R_{10}$, $R_{11}$, $R_{12}$, $R_{13}$, $R_{15}$, $R_{16}$, p, n and X have the abovementioned meaning and $R_{17}$ represents hydrogen or methyl and $R_{18}$ represents methyl, ethyl, chloromethyl, methoxymethyl, ethoxymethyl, propoxymethyl, butoxymethyl, allyloxymethyl, phenoxymethyl or phenyl.

In dyestuffs of the formula VI which are of very particular importance $R_{12}$ represents CH$_3$ or C$_2$H$_5$, $R_{16}$ represents CH$_3$, $R_{17}$ represents H and m and n represent the number 0.

Dyestuffs of the formula I are manufactured by the action of quaternising agents of the general formula $$R_3\text{-X} \qquad (VII)$$

on azo dyestuffs of the general formula

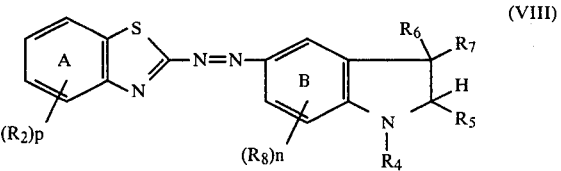

in a manner which is in itself known. In these formulae

X represents a radical which can be split off as an anion and $R_2$ to $R_8$, p, n, A and B have the meaning indicated for formula I.

Suitable quaternising compounds are, for example, alkyl halides, alkenyl halides, aralkyl halides, cycloalkyl halides, dialkyl sulphates, alkyl esters of arylsulphonic acids and other esters of strong mineral acids and organic sulphonic acids and, preferably, lower alcohols. The quaternising agents can be substituted further as, for example, in the case of bromopropionic acid amide or bromopropionitrile. The action of these compounds can take place with or without addition of a further solvent, or in aqueous suspension, at temperatures of 5°–100° C., preferably 15°–90° C. The presence of a basic material such as magnesium oxide, alkali metal carbonate, alkaline earth metal carbonate, potassium acetate, sodium bicarbonate or mixtures of such basic materials can be indicated. Examples of suitable solvents are halogenobenzenes, benzene hydrocarbons, dialkyl ketones, halogenoalkanes (such as carbon tetrachloride, tetrachloroethylene or chloroform), nitrobenzene, dimethylformamide, acetonitrile, glacial acetic acid, formic acid or alcohols.

The alkylation of azo dyestuffs of the formula VIII to give basic dyestuffs of the formula I also proves possible by the action of acrylic acid or its derivatives, for example acrylamide, in the presence of an organic or inorganic acid such as acetic acid, formic acid, hydrochloric acid or their mixtures, at temperatures between 50° and 100° C. The quaternisation can also be effected by the action of ethylene oxide or of an epoxy compound of the formula

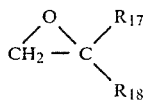
IX wherein $R_{17}$ and $R_{18}$ have the abovementioned meaning.

This reaction is carried out using a solvent in the presence of an organic or inorganic acid which yields the anion $X^-$, at temperatures of 10°–100° C., preferably at 40°–90° C. Examples of suitable acids are sulphuric acid, phosphoric acid, hydrochloric acid, hydrogen bromide, benzenesulphonic acid, toluenesulphonic acid, formic acid or propionic acid, and the liquid fatty acids can at the same time be used as solvents. Examples of further suitable solvents are dimethylformamide, acetonitrile, dioxane, tetrahydrofuran, halogenobenzene, benzene hydrocarbons, nitrobenzene, dialkyl ketones and the like.

Compounds of the formula VIII are obtained in a manner which is in itself known if 2-aminobenzthiazoles of the formula

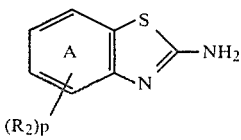
X are diazotised and then coupled to indolines of the formula

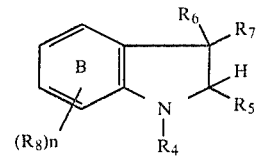
XI

In these formulae $R_2$, $R_4$, $R_5$, $R_6$, $R_7$, $R_8$, p, n, A and B have the meaning indicated for formula I.

Dyestuffs of the formula I can furthermore be manufactured by oxidatively coupling hydrazones of the formula

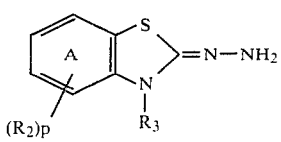
XII to indolines of the formula XI.

In the formula XII $R_2$, $R_3$, p and A have the meaning indicated for the formula I.

Examples of suitable benzthiazoles of the formula X are: 2-amino-6-methoxy-benzthiazole, 2-amino-6-ethoxy-benzthiazole, 2-amino-6-methoxy-4-methyl-benzthiazole, 2-amino-5,6-dimethoxy-benzthiazole, 2-amino-4,6-dimethoxy-benzthiazole 2-amino-5-methyl-6-methoxy-benzthiazole, 2-amino-6-(α-ethylcapronyl-amino)-benzthiazole, 2-amino-benzthiazole, 2-amino-6-benzoylamino-benzthiazole, 2-amino-6-acetylamino-benzthiazole 2-amino-6-butoxy-benzthiazole, 2-amino-6-propoxy-benzthiazole and 2-amino-6-methyl-benzthiazole.

Examples of suitable indolines of the formula XI are: N-methyl-2-methylindoline, N-ethyl-2-methylindoline, N-n-propyl-2-methylindoline, N-n-butyl-2-methylindoline, N-allyl-2-methylindoline, N-benzyl-2-methylindoline, N-2'-chlorobenzyl-2-methylindoline, N-4'-chlorobenzyl-2-methylindoline, N-4'-methylbenzyl-2-methylindoline, N-cyanomethyl-2-methylindoline, N-β-cyanoethyl-2-methylindoline, N-β-hydroxyethyl-2-methylindoline, N-β-chloroethyl-2-methylindoline, N-β-bromoethyl-2-methylindoline, N-β-methoxyethyl-2-methylindoline, N-β-acetoxyethyl-2-methylindoline, N-β-hydroxy-n-propyl-2-methylindoline, N-β-hydroxy-n-butyl-2-methylindoline, N-β-hydroxy-i-butyl-2-methylindoline, N-β-hydroxy-γ-methoxy-propyl-2-methylindoline, N-β-hydroxy-γ-ethoxy-propyl-2-methylindoline, N-β-hydroxy-γ-propoxy-propyl-2-methylindoline, N-β-hydroxy-γ-butoxy-propyl-2-methylindoline, N-β-hydroxy-γ-allyloxy-propyl-2-methylindoline, N-β-hydroxy-γ-phenoxy-propyl-2-methylindoline, N-β-hydroxy-β-phenylethyl-2-methylindoline, N-methyl-2,3,3-trimethyl-indoline, N-ethyl-2,3,3-trimethyl-indoline, N-butyl-2,3,3-trimethyl-indoline, N-allyl-2,3,3-trimethyl-indoline, N-benzyl-2,3,3-trimethyl-indoline, N-β-hydroxyethyl-2,3,3-trimethylindoline, N-β-chloroethyl-2,3,3-trimethylindoline, N-β-acetoxyethyl-2,3,3-trimethylindoline, N-methyl-2-γ-cyanopropyl-3,3-dimethylindoline, N-methyl-2-(γ-methoxycarbonyl-n-butyl)-3,3-dimethyl-indoline, N-β-n-amyloxyethyl-2-methylindoline, N-β-n-butyloxyethyl-2-methylindoline, N-β-t-butyloxyethyl-2-methylindoline,
N-β-cyclohexyloxy-ethyl-2-methylindoline,
N-β-benzoyloxyethyl-2-methylindoline,
N-β-(p-methoxycarbonylbenzoyloxy)-ethyl-2-methylindoline,
N-β-(p-methoxybenzoyloxy)ethyl-2-methylindoline,
N-β-phenoxyethyl-2-methylindoline
N-β-benzyloxyethyl-2-methylindoline
N-β-(β'-phenylethyloxy-)ethyl-2-methylindoline
N-β-(γ'-phenylpropyloxy-)ethyl-2-methylindoline
N-β-(β'-phenyloxyethyloxy-)ethyl-2-methylindoline
N-β-(p-chlorophenoxy-)ethyl-2-methylindoline
N-β-(p-chlorbenzyloxy-)ethyl-2-methylindoline
N-β-(o-chlorphenoxy-)ethyl-2-methylindoline
N-β-(p-methylphenoxy-)ethyl-2-methylindoline
N-β-(o-methylphenoxy-)ethyl-2-methylindoline
N-β-(p-ethylphenoxy-)ethyl-2-methylindoline
N-β-(o-ethylphenoxy-)ethyl-2-methylindoline
N-β-(m-methylphenoxy-)ethyl-2-methylindoline
N-β-(p-cyclohexylphenoxy-)ethyl-2-methylindoline
N-β-(β'-naphthoxy-)ethyl-2-methylindoline
N-β-(o-isopropyloxyphenoxy-)ethyl-2-methylindoline
N-β-(o,p-dichlorphenoxy-)ethyl-2-methylindoline
N-β-(p-phenylphenoxy-)ethyl-2-methylindoline
N-β-(o-benzylphenoxy-)ethyl-2-methylindoline
N-β-(p-benzylphenoxy-)ethyl-2-methylindoline
N-β-(p-tert.butylphenoxy-)ethyl-2-methylindoline
N-β-phenylthio-ethyl-2-methylindoline
N-β-pentachlorphenylthio-ethyl-2-methylindoline
N-β-(p-chlor-m-methylphenoxy)-ethyl-2-methylindoline
N-β-(p-methoxy-phenoxy-)-ethyl-2-methylindoline
N-β-(3,5-dimethylphenoxy-)-ethyl-2-methylindoline
N-β-(3,5-dimethyl-4-chlorphenoxy-)ethyl-2-methylindoline
N-β-(o-isopropylphenoxy-)ethyl-2-methylindoline
N-β-p-(2-phenylisopropyl)-phenoxy-ethyl-2-methylindoline
N-β-(1,2,3,4-tetrahydronaphth-(6-)oxy-)ethyl-2-methylindoline
N-β-(1,2,3,4-tetrahydronaphth-(1-)oxy-)ethyl-2-methylindoline
N-β-(phenylamino-carbonyloxy)ethyl-2-methylindoline a mixture of N-β-hydroxyethyl-2,3,3-trimethyl-6-trifluoromethyl-indoline and N-β-hydroxy-ethyl-2,3,3-trimethyl-4-trifluoromethylindoline, a mixture of N-β-hydroxyethyl-2,3,3,6-tetramethylindoline and N-β-hydroxyethyl-2,3,3,4-tetramethylindoline, N-β-hydroxyethyl-2,3,3,7-tetramethylindoline, 1,2,3,3,7-pentamethylindoline, N-β-hydroxyethyl-2,3,3-trimethyl-7-methoxyindoline, N-methylhexahydrocarbazole, N-ethyl-hexahydrocarbazole, 1,2,3,3-tetramethyl-7-chloroindoline, a mixture of 1,2,3,3,6-pentamethylindoline and 1,2,3,3,4-pentamethylindoline, N-β-hydroxyethyl-2,3,3,4,7-pentamethylindoline, N-β-hydroxyethyl-2,3,3,6,7-pentamethylindoline and 1-methyl-2-phenylindoline.

The new dyestuffs of the formula I are valuable dyestuffs which can be used for dyeing and printing materials of leather, tannin-treated cotton, cellulose, synthetic high molecular polyamides and high molecular polyurethanes and for dyeing fibres containing lignin, such as coir, jute and sisal. They are furthermore suitable for the manufacture of writing fluids, rubber-stamp inks and ball pen pastes and can also be used in flexographic printing.

Materials which are particularly suitable for dyeing with the basic dyestuffs of the formula I are flocks, fibres, filaments, tapes, woven fabrics or knitted fabrics of polyacrylonitrile or polyvinylidene cyanide or of copolymers of acrylonitrile with other vinyl compounds, such as vinyl chloride, vinylidene chloride, vinyl fluoride, vinyl acetate, vinylpyridine, vinylimidazole, vinyl alcohol, acrylic acid esters and amides, or methacrylic acid esters and amides, or flocks, fibres, filaments, tapes, woven fabrics or knitted fabrics of acid-modified aromatic polyesters and acid-modified polyamides. Examples of acid-modified aromatic polyesters are polycondensation products of sulphoterephthalic acid and ethylene glycol, that is to say polyethylene glycol terephthalates containing sulphonic acid groups (type Dacron 64 of E. I. DuPont de Nemours and Company), such as are described in Belgian Pat. No. 549,179 and U.S. Pat. No. 2,893,816.

Dyeing can be effected from a weakly acid liquor, the material appropriately being introduced into the dyebath at 40°–60° C. and then dyed at the boil. Dyeing is also possible under pressure at temperatures above 100° C. Furthermore, the dyestuffs can be added to spinning solutions for the manufacture of fibres containing polyacrylonitrile or be applied to the unstretched fibre.

The dyestuffs of the formula I are superior in their fastness properties to the products which carry hydrogen in position $R_4$. The dyestuffs can be employed individually or as mixtures.

Specially a large number of the new dyestuffs are distinguished by a good fastness to light, a high affinity to the fibre, a substantial insensitivity to different pH-values and the lack of staining on fibres of wool or polyamides or polyesters, which have no acid groups.

The dyestuffs according to the invention, and their mixtures, are well suited to dyeing mouldings of polymers or copolymers of acrylonitrile as asymmetrical dicyanoethylene and of acid-modified aromatic polyesters in chlorinated hydrocarbons as the dyebath, if they carry substituents which assist the solubility in chlorinated hydrocarbons, such as, for example, the tertiary butyl group or the dodecycloxy group, or the anion $X^-$ is the anion of a monobasic organic acid with 4–30 carbon atoms.

EXAMPLE 1

18 g of 2-amino-6-methoxybenthiazole are dissolved in a mixture of 120 ml of glacial acetic acid and 60 ml of water, 29 ml of 48% strength sulphuric acid are then added and the amount of nitrosylsulphuric acid which corresponds to 7 g of sodium nitrite is added dropwise at −5° C. After stirring for a further hour at this temperature, 1 g of amidosulphonic acid is added and the resulting diazonium salt solution is then added dropwise to a mixture of 250 g of ice, 50 ml of water, 20 ml of 48% strength sulphuric acid and 17.7 g of N-hydroxyethyl-2-methylindoline. The mixture is stirred for a further hour at approx. −10° C. and is then neutralised to pH 4 by dropwise addition of 20% strength sodium hydroxide solution. Whilst doing so, the temperature is kept below 0° C.

After completion of coupling, the azo dyestuff is filtered off, washed with water and dried in vacuo. The resulting black-violet powder is stirred into 100 ml of chloroform and 18 g of dimethyl sulphate are added dropwise at the boiling point of the chloroform. The mixture is then stirred for a further 30 minutes under reflux cooling and 300 ml of boiling water are then metered in. In the course thereof, the chloroform distils off. 40 g of sodium chloride and 5 g of zinc chloride are added to the resulting solution at 50°, the mixture is cooled and the dyestuff which crystallises out is filtered off and dried in vacuo.

It has the formula

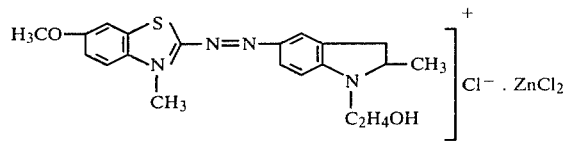

and dyes polyacrylonitrile fibres in a blue shade of good fastness to light and to wet processing. The dyestuff is distinguished by very good stability to boiling.

It can also be prepared by effecting the quaternisation with p-toluenesulphonic acid methyl ester or with methyl iodide instead of with dimethyl sulphate.

Valuable dyestuffs are also obtained if the following 2-aminobenzthiazoles are coupled with the indicated indolines in the manner described and the azo dyestuff is freed of acid and methylated with dimethyl sulphate.

The dyeings of the dyestuffs on polyacrylonitrile give the colour shade which is also listed:

| 2-Aminobenzthiazole | Indoline | Colour shade on polyacrylonitrile |
|---|---|---|
| 6-methoxy- | 1-n-butyl-2-methylindoline | blue |
| 6-ethoxy | 1-β-hydroxyethyl-2-methylindoline | blue |
| 6-methoxy- | 1-benzyl-2-methylindoline | blue |
| 6-ethoxy | " | blue |
| 6-ethoxy- | 1-n-butyl-2-methylindoline | blue |
| 6-methoxy- | 1-β-chloroethyl-2-methylindoline | blue |
| 6-ethoxy | " | blue |
| 6-methoxy- | 1-β-acetoxyethyl-2-methylindoline | blue |
| 6-ethoxy- | " | blue |
| 6-methoxy- | 1-allyl-2-methylindoline | blue |
| 6-ethoxy- | " | blue |
| 6-methoxy- | 1-β-cyanoethyl-2-methylindoline | blue |
| 6-ethoxy- | " | blue |
| 6-methoxy- | 1-cyanomethyl-2-methylindoline | reddish-tinged blue |
| 6-methoxy- | 1-β-methoxyethyl-2-methylindoline | blue |
| 6-methoxy- | 1-β-hydroxy-n-propyl-2-methylindoline | blue |
| 6-methoxy- | 1-β-hydroxy-n-butyl-2-methylindoline | blue |
| 6-methoxy- | 1-β-hydroxy-β-phenylethyl-2-methylindoline | blue |
| 6-methoxy- | 1-n-propyl-2-methylindoline | blue |
| 6-methoxy- | 1-β-bromoethyl-2-methylindoline | blue |
| 6-methoxy- | 1-β-hydroxy-γ-allyloxy-n-propyl-2-methylindoline | blue |
| 6-methoxy- | 1-β-hydroxy-γ-methoxy-n-propyl-2-methylindoline | blue |
| 6-methoxy- | 1-β-hydroxy-γ-ethoxy-n-propyl-2-methylindoline | blue |
| 6-methoxy- | 1-β-hydroxy-γ-chloro-n-propyl-2-methylindoline | blue |
| 6-ethoxy- | " | blue |
| 6-methoxy- | 1-(4'-chlorobenzyl)-2-methylindoline | blue |
| 6-methoxy- | 1-(2'-chlorobenzyl)-2-methylindoline | blue |
| 6-methoxy- | 1-(4'-methylbenzyl)-2-methylindoline | blue |
| 6-methoxy- | 1-isopropyl-2-methylindoline | blue |
| 6-methoxy- | 1,2,3,3-tetramethylindoline | blue |
| 6-methoxy- | 1-ethyl-2,3,3-trimethylindoline | blue |
| 6-methoxy- | 1-n-butyl-2,3,3-trimethylindoline | blue |
| 6-methoxy- | 1-allyl-2,3,3-trimethylindoline | blue |
| 6-methoxy- | 1-β-hydroxyethyl-2,3,3-trimethylindoline | blue |
| 6-methoxy- | 1-β-chloroethyl-2,3,3-trimethylindoline | blue |
| 6-methoxy- | 1-β-acetoxyethyl-2,3,3-trimethylindoline | blue |
| 6-methoxy- | mixture of 1,2,3,3,6-pentamethylindoline and 1,2,3,3,4-pentamethylindoline | blue |
| 6-methoxy- | mixture of 1-β-hydroxyethyl-2,3,3,6-tetramethylindoline and 1-β-hydroxyethyl-2,3,3,4-tetramethylindoline | blue |
| 6-methoxy- | mixture of 1-β-hydroxyethyl-2,3,3-trimethyl-4-trifluoromethyl-indoline and 1-β-hydroxyethyl-2,3,3-trimethyl-6-trifluoromethylindoline | blue |
| 6-methoxy- | 1,2,3,3,6,7-hexamethylindoline | blue |
| 6-methoxy- | 1-β-hydroxyethyl-2,3,3,6,7-pentamethylindoline | blue |
| 6-methoxy- | 1,3,3-trimethyl-2-γ-cyanopropylindoline | blue |
| 6-methoxy- | 1,3,3-trimethyl-2-(γ-methoxycarbonyl-n-butyl)-indoline | blue |
| 6-methoxy- | 1,2,3,3-tetramethyl-7-methoxyindoline | blue |
| " | 1,2,3,3-tetramethyl-7-chloro-indoline | blue |
| " | 1,2,3,3,7-pentamethylindoline | blue |
| 6-methoxy- | mixture of 1,2,3,3-tetramethyl-6-chloroindoline and 1,2,3,3-tetramethyl-4-chloroindoline | blue |
| " | 1-cyanomethyl-2,3,3-trimethylindoline | reddish-tinged blue |
| " | N-methyl-hexahydrocarbazole | blue |
| " | N-ethyl-hexahydrocarbazole | navy-blue |
| 6-methoxy- | 1-methyl-2-phenylindoline | blue |
| 6-ethoxy- | 1-methyl-2-phenylindoline | blue |
| 6-methoxy- | 1-β-hydroxyethyl-2-phenylindoline | blue |

-continued

The dyeings of the dyestuffs on polyacrylonitrile give the colour shade which is also listed:

| 2-Aminobenzthiazole | Indoline | Colour shade on polyacrylonitrile |
|---|---|---|
| 6-methoxy- | 1-$\beta$-chloroethyl-2-phenylindoline | blue |
| 6-methoxy- | 1-$\beta$-acetoxyethyl-2-phenylindoline | blue |
| 6-methoxy- | 1-ethyl-2-phenylindoline | blue |
| 6-methoxy- | 1-methyl-2-p-methylphenylindoline | blue |
| 6-methoxy- | 1-methyl-2-p-methoxyphenylindoline | blue |
| 6-methoxy- | 1-$\beta$-methoxyethyl-2-phenylindoline | blue |
| 6-benzoylamino- | 1-benzyl-2-methylindoline | blue |
| 6-benzoylamino- | 1-$\beta$-hydroxyethyl-2-methylindoline | blue |
| 6-acetylamino- | 1-benzyl-2-methylindoline | blue |
| 6-($\alpha$-ethyl-capronyl)-amino- | 1-$\beta$-hydroxyethyl-2-methylindoline | blue |
| 6-methoxy-4-methyl | 1-$\beta$-hydroxyethyl-2-methylindoline | blue |
| " | 1-benzyl-2-methylindoline | blue |
| 5,6-dimethoxy- | 1-$\beta$-hydroxyethyl-2-methylindoline | blue |
| 4,6-dimethoxy- | 1-$\beta$-hydroxyethyl-2-methylindoline | blue |
| 6-methoxy- | 1-$\beta$-hydroxy-$\gamma$-phenoxy-n-propyl-2-methylindoline | blue |
| mixture of 5-methyl-6-methoxy and 7-methyl-6-methoxy | 1-$\beta$-hydroxyethyl-2-methylindoline | blue |
| 6-propoxy- | " | blue |
| 6-propoxy- | " | blue |
| 2-aminobenzthiazole | 1-$\beta$-hydroxyethyl-2-methylindoline | reddish-tinged blue |
| 6-benzyloxy- | " | blue |
| 6-tert.-butyl- | " | blue |
| 6-methyl- | " | blue |
| 6-benzyl- | " | blue |
| 4,6,7-trimethyl- | " | blue |
| 4,6-dimethyl | " | blue |
| 6-ethyl- | " | blue |
| 6-methoxy- | 1-cyclohexyl-2-methylindoline | blue |
| 6-ethoxy- | " | blue |
| 6-methyl- | 1-benzyl-2-methylindoline | blue |
| 6-methoxy- | 1-$\beta$-(phenylamino-carbonyloxy)-ethyl-2-methylindoline | blue |
| 6-methoxy- | N-$\beta$-($\omega$-hydroxyethyloxy)-ethyl-2-methylindoline | blue |
| 6-methoxy- | N-$\beta$-($\omega$-chloroethyloxy)-ethyl-2-methylindoline | blue |
| 6-methoxy- | N-$\beta$-n-amyloxyethyl-2-methylindoline | blue |
| " | N-$\beta$-n-butyloxy-ethyl-2-methylindoline | " |
| " | N-$\beta$-t-butyloxy-ethyl-2-methylindoline | " |
| " | N-$\beta$-cyclohexyloxy-ethyl-2-methylindoline | " |
| " | N-$\beta$-benzoyloxy-ethyl-2-methylindoline | " |
| " | N-$\beta$-(p-methoxycarbonylbenzoyloxy)-ethyl-2-methylindoline | " |
| " | N-$\beta$-(p-methoxybenzoyloxy)-ethyl-2-methylindoline | " |
| " | N-$\beta$-phenoxy-ethyl-2-methylindoline | " |
| " | N-$\beta$-benzyloxy-ethyl-2-methylindoline | " |
| " | N-$\beta$-($\beta'$-phenylethyloxy)-ethyl-2-methylindoline | " |
| " | N-$\beta$-($\gamma'$-phenylpropyloxy)ethyl-2-methylindoline | " |
| " | N-$\beta$-($\beta'$-phenyloxyethyloxy-)ethyl-2-methylindoline | " |
| " | N-$\beta$-(p-chlorphenoxy-)ethyl-2-methylindoline | " |
| " | N-$\beta$-(p-methylbenzyloxy-)ethyl-2-methylindoline | " |
| " | N-$\beta$-o-chlorphenoxy-)ethyl-2-methylindoline | " |
| " | N-$\beta$-(p-methylphenoxy-)ethyl-2-methylindlline | " |
| " | N-$\beta$-(o-methylphenoxy-)ethyl-2-methylindoline | " |
| " | N-$\beta$-(p-ethylphenoxy-)ethyl-2-methylindoline | blue |
| " | N-$\beta$-(o-ethylphenoxy-)ethyl-2-methylindoline | " |
| " | N-$\beta$-(m-methylphenoxy-)ethyl-2-methylindoline | " |
| " | N-$\beta$-(p-cyclohexylphenoxy-)ethyl-2-methylindoline | " |
| " | N-$\beta$-($\beta'$-napthoxy-)ethyl-2-methylindoline | " |
| " | N-$\beta$-(o-isopropyloxyphenoxy)-ethyl-2-methylindoline | " |
| " | N$\beta$-(o,p-dichlorophenoxy)-ethyl-2-methylindoline | " |
| " | N-$\beta$-(p-phenylphenoxy)-ethyl-2-methylindoline | " |
| " | N-$\beta$-(o-benzylphenoxy)-ethyl-2-methylindoline | " |
| " | N-$\beta$-(p-benzylphenoxy)-ethyl-2-methylindoline | " |
| " | N-$\beta$-(p-tert.butylphenoxy)-ethyl-2-methylindoline | " |
| " | N-$\beta$-(phenylthio)-ethyl-2-methylindoline | " |
| " | N-$\beta$-(pentachlorophenyl)-ethyl-2-methylindoline | " |
| " | N-$\beta$-(p-chloro-m-methylphenoxy)-ethyl-2-methylindoline | " |
| 6-methoxy | N-$\beta$-(p-methoxyphenoxy)-ethyl-2-methylindoline | blue |
| " | N-$\beta$-(3,5-dimethylphenoxy)-ethyl-2-methylindoline | blue |
| " | N-$\beta$-(3,5-dimethyl-4-chlorophenoxy)-ethyl-2-methylindoline | " |
| " | N-$\beta$-(o-isopropylphenoxy)-ethyl-2-methylindoline | " |
| " | N-$\beta$-[p-(2-phenylisopropyl)-phenoxy]-ethyl-2-methylindoline | " |
| " | N-$\beta$-(1,2,3,4-tetrahydronaphth-(6)-oxy)-ethyl-2-methylindoline | " |
| " | N-$\beta$-(1,2,3,4-tetrahydronaphth-(1)-oxy)-ethyl-2-methylindoline | " |

EXAMPLE 2

If the procedure in Example 1 is followed and thereafter, instead of dimethyl sulphate, the equivalent amount of diethyl sulphate is employed, in which case it is desirable to extend the period of alkylation to 6 hours, the dyestuff of the formula is obtained.

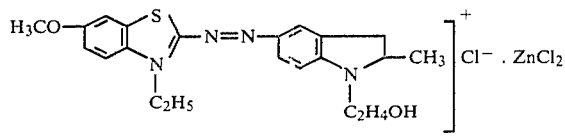

It is distinguished by very good stability to boiling and dyes polyacrylonitrile in a blue colour shade. Similarly good results are obtained if in the manufacture of the dyestuffs mentioned in the table accompanying Example 1, diethyl sulphate is used instead of dimethyl sulphate.

EXAMPLE 3

20 g of the azo dyestuff described in Example 1, which has not been reacted with dimethyl sulphate, are stirred with 30 ml of acetonitrile and 30 ml of n-butyl bromide, 1 g of magnesium oxide is added and the mixture is heated to 80°–85° C. for 12 hours. The solvents are then distilled off in the vacuum of a water pump. The distillation residue is dissolved in hot water and clarified with 3 g of active charcoal. The dyestuff is then precipitated with sodium chloride, separated from the solution and dried in vacuo. The reaction product has the formula

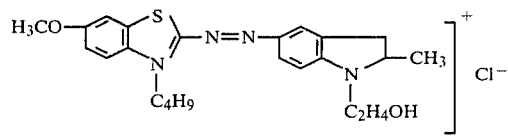

It dyes polyacrylonitrile in a blue colour shade.

EXAMPLE 4

23.3 g of N-benzyl-2-methylindoline are added dropwise over the course of 1 hour at −10° to a diazonium salt solution prepared from 18 g of 2-amino-6-methoxybenzthiazole as described in Example 1, the mixture is stirred for a further 30 minutes, and 300 g of ice are then added.

Hereupon, the acid salt of the azo dyestuff crystallises. After stirring for a further 5 hours at below 0° C. it is filtered off, washed with water and again stirred into 300 ml of water. Sodium hydroxide solution is then added dropwise until a pH value of 8 persists and the product is pressed out, washed with water and dried in vacuo.

The dried product is stirred into 50 ml of glacial acetic acid at 50°. Ethylene oxide is then passed in and the temperature is slowly raised to 80°.

As soon as the quaternisation, which can readily be followed in the thin layer chromatogram, is complete, the solution is stirred into 250 ml of 20% strength sodium chloride solution and is stirred for some minutes longer, and the dyestuff which has crystallised is then pressed out. It is dried in vacuo and is obtained in quantitative yield.

The product has the formula:

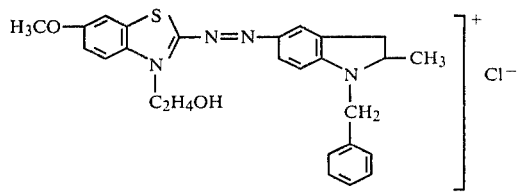

It dyes polyacrylonitrile in a blue colour shade and is distinguished by very good stability to boiling.

EXAMPLE 5

If the procedure indicated in Example 4 is followed and 12.5 g of 1,2-butylene oxide are added instead of ethylene oxide, analogous working up yields the dyestuff of the formula

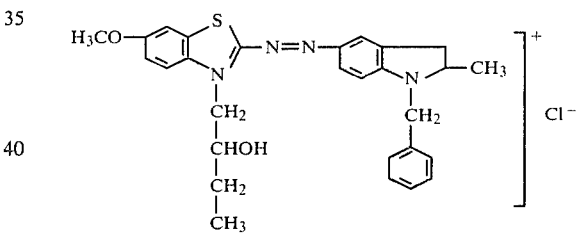

which also dyes polyacrylonitrile in a blue colour having good fastness properties.

Valuable dyestuffs are also obtained if the procedure in Examples 4 and 5 is followed, reacting the 2-aminobenzthiazoles and indolines, listed in the table which follows, with one another, and then quaternising the product with the epoxides mentioned. Dyeing polyacrylonitrile with these examples gives the colour shades which are also indicated.

| 2-Aminobenzthiazole | Indoline | Quaternised with | Colour shade on polyacrylonitrile |
|---|---|---|---|
| 6-methoxy- | 1-methyl-2-phenylindoline | ethylene oxide | blue |
| " | 1-β-hydroxyethyl-2-methylindoline | " | blue |
| " | 1-n-butyl-2-methylindoline | " | blue |
| 6-ethoxy- | 1-benzyl-2-methylindoline | " | blue |
| 6-methoxy- | 1-p-chlorobenzyl-2-methylindoline | " | blue |
| " | 1-o-chlorobenzyl-2-methylindoline | " | blue |
| " | 1-p-methylbenzyl-2-methylindoline | " | blue |
| " | 1-β-hydroxyethyl-2-phenylindoline | " | blue |
| " | 1,2-dimethylindoline | " | blue |
| " | 1-allyl-2-methylindoline | " | blue |
| " | 1-β-chloroethyl-2-methylindoline | " | blue |
| " | 1-β-hydroxy-n-butyl-2-methylindoline | " | blue |
| " | 1-β-hydroxy-γ-chloro-n-propyl-2-methylindoline | " | blue |

-continued

| 2-Aminobenzthiazole | Indoline | Quaternised with | Colour shade on polyacrylonitrile |
|---|---|---|---|
| " | 1-benzyl-2-methylindoline | propylene oxide | blue |
| " | 1-β-hydroxyethyl-2-methylindoline | " | blue |
| " | 1-ethyl-2,3,3-trimethylindoline | ethylene oxide | blue |
| " | 1-β-hydroxyethyl-2,3,3-trimethylindoline | " | blue |
| 6-methyl- | 1-benzyl-2-methylindoline | " | blue |
| " | 1-β-hydroxyethyl-2-methylindoline | 1,2-butylene oxide | blue |
| 6-methoxy- | 1-β-hydroxyethyl-2-methylindoline | γ-phenoxypropylene oxide | blue |
| " | 1-benzyl-2-methylindoline | " | blue |
| " | 1-β-hydroxyethyl-2-methylindoline | γ-allyloxypropylene oxide | blue |
| " | 1-benzyl-2-methylindoline | " | blue |
| " | 1-β-hydroxyethyl-2-methylindoline | 1,2-butylene oxide | blue |
| " | 1-β-hydroxyethyl-2-methylindoline | γ-methoxypropylene oxide | blue |
| " | 1-benzyl-2-methylindoline | " | blue |
| " | 1-β-hydroxyethyl-2-methylindoline | γ-ethoxypropylene oxide | blue |
| " | 1-benzyl-2-methylindoline | γ-ethoxypropylene oxide | blue |
| " | 1-β-hydroxyethyl-2-methylindoline | γ-butoxypropylene oxide | blue |
| " | 1-benzyl-2-methylindoline | γ-butoxypropylene oxide | blue |
| " | 1-cyanoethyl-2-methylindoline | 1,2-butylene oxide | blue |
| " | " | ethylene oxide | blue |
| " | " | propylene oxide | blue |
| " | 1-β-acetoxyethyl-2-methylindoline | propylene oxide | blue |
| " | " | 1,2-butylene oxide | blue |
| 6-methoxy- | 1-butyl-2-methylindoline | 1,2-butylene oxide | blue |
| " | " | propylene oxide | blue |
| " | 1-β-hydroxyethyl-2-methylindoline | epichlorohydrin | blue |
| " | 1-benzyl-2-methylindoline | " | blue |
| " | 1-β-(phenylamino-carbonyloxy)-ethyl-2-methylindoline | ethylene oxide | blue |

EXAMPLE 6

A polyacrylonitrile fabric is printed with a printing paste which has manufactured as follows: 30 parts by weight of the dyestuff described in Example 1, 50 parts by weight of thiodiethylene glycol, 30 parts by weight of cyclohexanol and 30 parts by weight of 30% strength acetic acid are covered with 330 parts by weight of hot water and the resulting solution is added to 500 parts by weight of crystal gum (gum arabic as a thickener). Finally, 30 parts by weight of zinc nitrate solution are also added. The resulting print is dried, steamed for 30 minutes and subsequently rinsed. A blue print of very good fastness properties is obtained.

EXAMPLE 7

Acid-modified polyglycol terephthalate fibres are introduced, using a liquor ratio of 1:40, into an aqueous bath at 20° C. which contains, per litre, 3 to 10 g of sodium sulphate, 0.1 to 1 g of oleyl polyglycol ether (50 mols of ethylene oxide), 0-15 g of dimethylbenzyl-dodecylammonium chloride and 0.15 g of the dyestuff described in the 1st position of the table accompanying Example 1, and which has been adjusted to pH 4 to 5 with acetic acid. The bath is heated to 100° C. over the course of 30 minutes and kept at this temperature for 60 minutes. Thereafter the fibres are rinsed and dried. A blue dyeing of good fastness properties is obtained.

EXAMPLE 8

Polyacrylonitrile fibres are introduced, using a liquor ratio of 1:40, into an aqueous bath at 40° C. which contains, per liter, 0.75 g of 30% strength acetic acid, 0.38 g of sodium acetate and 0.15 g of the dyestuff described in Example 1. The bath is heated to the boil over the course of 20-30 minutes and is kept at this temperature for 30-60 minutes. After rinsing and drying, a blue dyeing having very good fastness properties is obtained.

EXAMPLE 9

A stock solution is prepared from 15 parts by weight of the drystuff mentioned in Example 1, 15 parts by weight of polyacrylonitrile and 70 parts by weight of dimethylformamide and is added to a customary polyacrylonitrile spinning solution which is spun in a known manner. A blue dyeing having very good fastness properties is obtained.

EXAMPLE 10

Acid-modified synthetic polyamide fibres are introduced, using a liquor ratio of 1:40, into an aqueous bath at 40° C. which contains, per liter, 10 g of sodium acetate, 1 to 5 g of oleyl polyglycol ether (50 mols of ethylene oxide) and 0.3 g of the dyestuff described in Example 1 and which has been adjusted to pH 4-5 with acetic acid. The bath is heated to 98° C. over the course of 30 minutes and kept at this temperature. Thereafter the fibres are rinsed and dried. A blue dyeing is obtained.

I claim:
1. Dyestuff of the formula

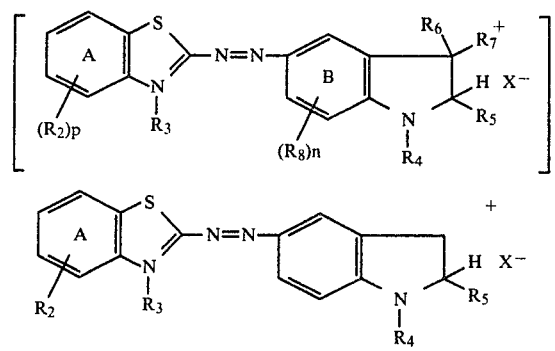

wherein
$R_2$ is $C_1$–$C_6$-alkoxy,

R₃ is cyclohexyl, benzyl, phenylethyl, β-phenyl-β-hydroxyethyl, phenylpropyl-(2,2), C₁–C₆-alkyl, or C₂–C₆-alkenyl, said alkyl and said alkenyl being unsubstituted or substituted by chloro, bromo, hydroxy, methoxy, cyano, acetoxy, aminocarbonyl, carboxy, allyloxy or methoxycarbonyl;

R₄ is R₃ or
β-n-amyloxyethyl,
β-n-butyloxyethyl,
β-t-butyloxyethyl,
β-cyclohexyloxy-ethyl,
β-benzoyloxyethyl,
β-(p-methoxycarbonylbenzoyloxy)-ethyl,
β-(p-methoxybenzoyloxy)ethyl,
β-phenoxyethyl,
β-benzyloxyethyl,
β-(β'-phenylethyloxy)ethyl,
β-(γ'-phenylpropyloxy)-ethyl,
β-(β'-phenyloxyethyloxy)-ethyl,
β-(p-chlorphenoxy)-ethyl,
β-(p-chlorbenzyloxy)-ethyl,
β-(o-chlorphenoxy)-ethyl,
β-(p-methylphenoxy)-ethyl,
β-(o-methylphenoxy)-ethyl,
β-(p-ethylphenoxy)-ethyl,
β-(o-ethylphenoxy)-ethyl,
β-(m-methylphenoxy)-ethyl,
β-(p-cyclohexylphenoxy)-ethyl,
β-(β'-naphthoxy)-ethyl,
β-(o-isopropyloxyphenoxy)-ethyl,
β-(o,p-dichlorphenoxy)-ethyl,
β-(p-phenylphenoxy)-ethyl,
β-(o-benzylphenoxy)-ethyl,
β-(p-benzylphenoxy)-ethyl,
β-(p-tert.butylphenoxy)-ethyl,
β-phenylthio-ethyl,
β-pentachlorphenylthio-ethyl,
β-(p-chlor-m-methylphenoxy)-ethyl,
β-(p-methoxy-phenoxy)-ethyl,
β-(3,5-dimethylphenoxy)-ethyl,
β-(3,5-dimethyl-4-chlorphenoxy)-ethyl,
β-(o-isopropylphenoxy)-ethyl,
β-p-(2-phenylisopropyl)-phenoxy-ethyl,
β-(1,2,3,4-tetrahydronaphth-(6-)oxy)-ethyl,
β-(1,2,3,4-tetrahydronaphth-(1-)oxy)-ethyl or
β-(phenylamino-carbonyloxy)-ethyl;

R₅ is C₁–C₆-alkyl, cyclohexyl, phenyl, 4-methyl-phenyl, 2-methyl-phenyl, 4-chloro-phenyl, 2-chlorophenyl or 2-methyl-4-chloro-phenyl; and X⁻ is an anion; and
in addition ring A can be fused to an unsubstituted benzene ring.

2. A dyestuff according to claim 1, wherein
R₂ is C₁–C₄-alkoxy in 6-position,
R₃ is

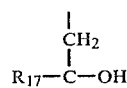

R₅ is methyl, phenyl, α-cyanopropyl or α-methoxycarbonyl-n-butyl,
R₁₇ is hydrogen or methyl, and
R₁₈ is methyl, ethyl, chloromethyl, methoxymethyl, ethoxymethyl, propoxymethyl, butoxymethyl, allyloxymethyl, phenoxymethyl or phenyl.

3. Dyestuff according to claim 1, wherein
R₂ is C₁–C₄-alkoxy in 6-position,
R₃ is methyl, ethyl, propyl, butyl, β-chloroethyl, β-cyanoethyl,
β-bromoethyl, β-acetoxyethyl, β-carboxyethyl, β-carbonamidoethyl, allyl or benzyl; and
R₅ is methyl, phenyl, α-cyanopropyl or α-methoxycarbonyl-n-butyl.

4. Dyestuff according to claim 1 wherein
R₂ is methyl or ethyl, and
R₃ and R₄ are methyl.

5. Dyestuff according to claim 1, wherein
R₂ is C₁–C₄-alkoxy in the 6-position,
R₃ is —C₂H₄OH, and
R₅ is methyl, phenyl, α-cyanopropyl or α-methoxycarbonyl-n-butyl.

6. Dyestuff according to claim 5, wherein
R₂ is methyl or ethyl, and
R₅ is methyl.

7. Dyestuff according to claim 1 of the formula

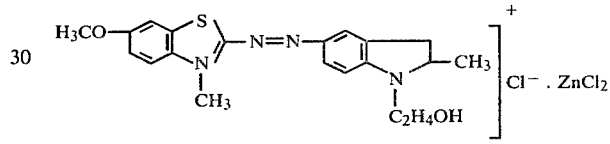

8. Dyestuff according to claim 1 of the formula

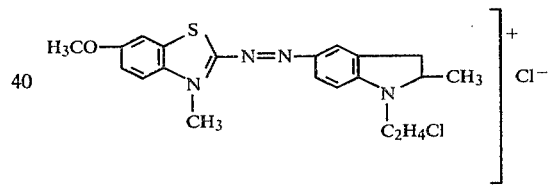

9. Dyestuff according to claim 1 of the formula

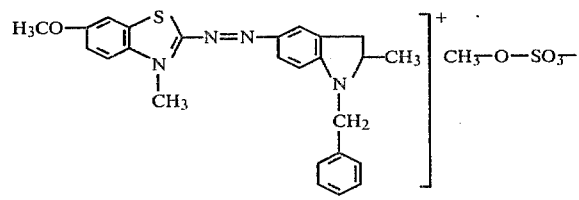

10. Dyestuff according to claim 1 of the formula

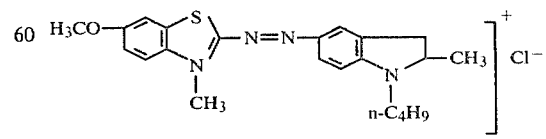

* * * * *